Figure 1:
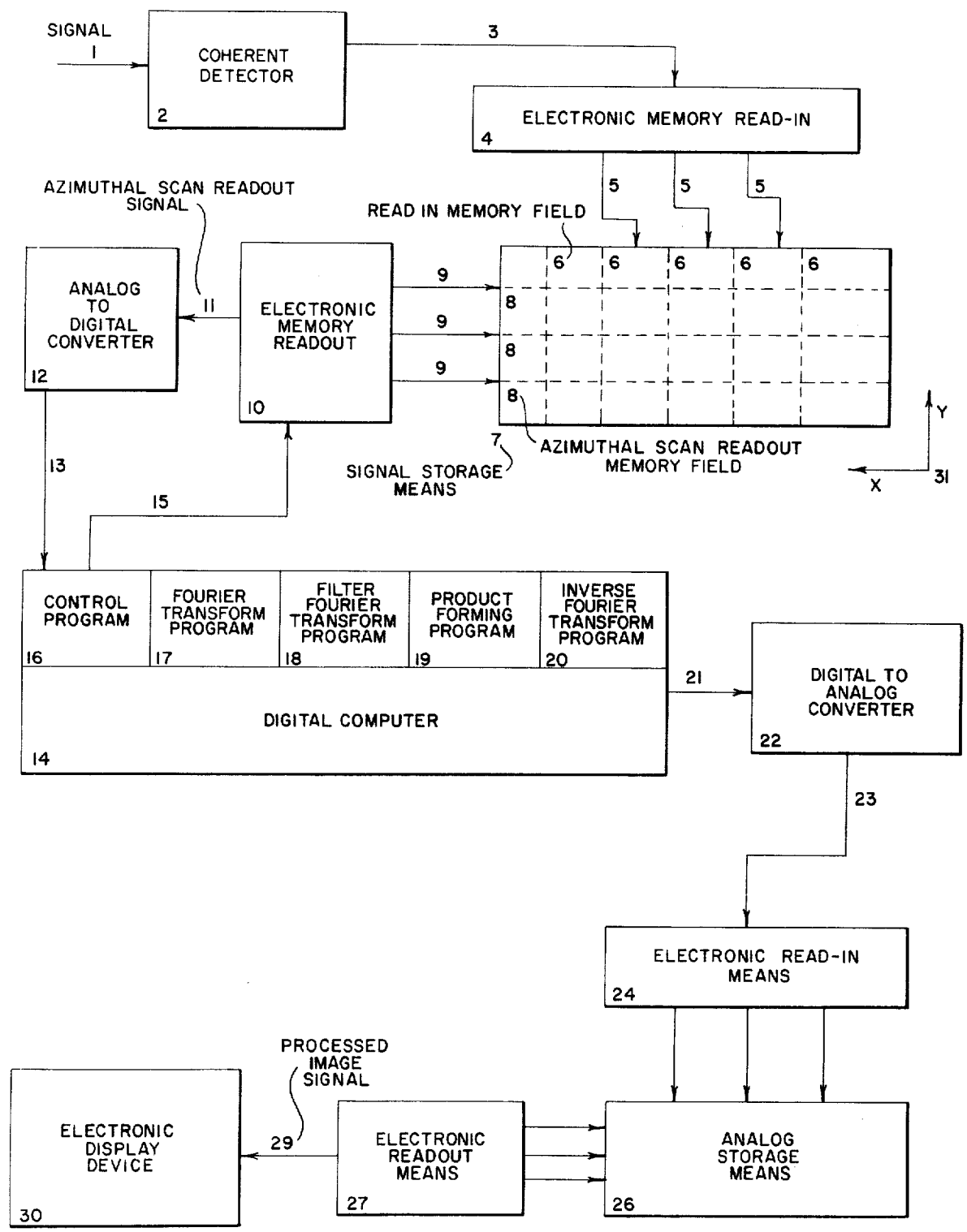

United States Patent [19]
Klahr

[11] 3,885,224
[45] May 20, 1975

[54] SIGNAL PROCESSING APPARATUS FOR IMAGING SCANNER

[76] Inventor: Carl N. Klahr, Lawrence, N.Y.

[22] Filed: Sept. 13, 1973

[21] Appl. No.: 396,774

Related U.S. Application Data
[63] Continuation-in-part of Ser. No. 228,805, Feb. 24, 1972, Pat. No. 3,805,596.

[52] U.S. Cl. ........ 340/5 MP; 73/67.8 S; 340/15.5 F; 343/5 DP
[51] Int. Cl. ............................................. G01s 9/66
[58] Field of Search ...... 340/1 R, 3 R, 5 MP, 15.5 F; 73/67.8 S, 67.9; 343/5 CM, 5 DP

[56] References Cited
UNITED STATES PATENTS
| | | | |
|---|---|---|---|
| 3,076,177 | 1/1963 | Lawrence et al. | 340/15.5 F |
| 3,548,642 | 12/1970 | Flaherty et al. | 73/67.5 |
| 3,719,922 | 3/1973 | Lopes, Jr. et al. | 340/5 MP |
| 3,805,596 | 4/1974 | Klahr | 73/67.8 S |

*Primary Examiner*—Richard A. Farley
*Attorney, Agent, or Firm*—Browdy & Neimark

[57] ABSTRACT

This invention comprises apparatus for mathematical processing of a sequence of pulse signal time functions, produced by an ultrasonic imaging scanner. The basic processor described herein has a slower processing rate than the input rate of back-reflected pulse signal time function values. The reflected pulse signal time function values are stored, rearranged in sequence, and convoluted with a specified filter function to produce a processed image signal time function for imaging. Specific electronic apparatus is utilized including a digital computer with stored internal program for fourier convolution and filter function synthesis.

18 Claims, 1 Drawing Figure

SIGNAL PROCESSING APPARATUS FOR IMAGING SCANNER

This patent application is a continuation in part of copending patent application, Ser. No. 228,805 entitled High Resolution Ultrasonic Imaging Scanner, filed Feb. 24, 1972 issued as U.S. Pat. No. 3,805,596 on April 23, 1974.

This invention relates generally to improvements in and particular structures for said High Resolution Ultrasonic Imaging Scanner. More specifically it is concerned with the mathematical processing apparatus used in said high resolution ultrasonic scanner. It is also concerned with mathematical processing apparatus for other imaging scanners, used, for example, for reconstructing images from radar pulse reflections over a synthetic aperture of pulse signal observation points, or from explosive detonation reflections in geophysical observation.

One object of the present invention is to provide simple and economical electronic apparatus for performing said mathematical processing. The basic processor described herein may have a much slower processing rate than the input rate of back reflected pulse signal time function values. This will make the present invention an economical one for image signal processing.

One of the significant considerations in mathematical processing of the detected sequence of pulse signal time function values is adjustment of the imput rate of the pulse signal values to the processing rate of the computation apparatus. It will be understood that various computing apparatus types will process the data at different time rates, and the order of the computation steps may depend on the time processing rate; thus the processing rate and the order of steps in the computation will depend on the nature of the apparatus. The present invention will provide relatively low cost apparatus which can process the pulse signal time functions at a slower rate than the rate at which they are inputted from the pulse detectors.

Another object of the present invention is to provide a mathematical processing apparatus which can be made by combining and adapting readily available and economical electronic component subsystems, thus minimizing the special fabrication requirements in producing the apparatus, and providing an economical system.

Another object of the present invention is to provide a compact and reliable apparatus for mathematical processing of said detected signals.

Another object of the present invention is to minimize the phase sensitivity requirements in the design of said ultrasonic imaging scanner, since the particular types of mathematical processing apparatus to be described will permit wider variations in the electronic pulse timing of the ultrasonic scanner.

Another object of the present invention is to provide mathematical processing apparatus that will be applicable to a microwave (radar) imaging scanner, or to a geophysical explosive detonation scanner, in the same manner as to an ultrasonic imaging scanner, with its attendant advantages of economy and simplicity.

Another object of the present invention is to provide a mathematical processing apparatus which can be used for convenient storage and display of the processed image. In addition to the possibility of real-time electronic display of the image, the present invention will provide the possiblity of convenient storage of the processed image. This will permit repeated signal collection to increase the signal to noise ratio for faint images. It may also be used for repeated recall and reviewing of the image by electronic means.

In order to set forth the description and the advantages of the present invention it will first be useful to describe the special features of said high resolution ultrasonic imaging scanner.

An ultrasonic imaging scanner is a system wherewith a reflecting body in an ultrasonic propagation medium is scanned across an aperture by a set of ultrasonic pulses. From the back-reflected pulse signal time functions the scanner produces a processed image signal time function for high resolution viewing of said reflecting body. This image will have a specified minimal resolution width which may be as small as the order of an ultrasonic wavelength in each of two dimensions: (1) the range dimension, from the transducer to any point on the reflecting body; (2) the azimuthal dimension, normal to the range.

Such an ultrasonic imaging system will be two dimensional, giving a view of a cross sectional slice through the object viewed, in which the traverse of a transducer across an aperture parallel to the surface is one dimension of the slice, the azimuthal dimension. The direction normal to the surface, the range dimension, is the other. This imaging technique is called ultrasonic laminography because it produces images of slices or thin layers, hence the term lamina. The two dimensions of such a view will be termed the range dimension, normal to the surface, and the lateral or azimuthal dimension, parallel to the predetermined path or aperture of the transducer along the surface.

The high resolution ultrasonic imaging scanner utilizes the diffraction of the ultrasonic waves scattered from the object to be viewed. The diffracted waves are received by the scanner over a large viewing aperture which coincides with the predetermined path or traverse length of the transducer. The means for receiving the diffracted waves over this aperture is by replicating said transducer at a succession of positions along this aperture. These replicated positions of the transducer may be made simultaneous in time by placing an array of transducers at the selected positions. However the replication need not be simultaneous in time. A single transducer or several transducers may be placed at successive times in a sequence of positions along the aperture. When the transducer moves to a succession of positions along this aperture the replication of transducer positions may be obtained with a single transducer which is placed at successive times at the selected succession of positions along the predetermined path or aperture.

In such a system one can specify the size of the resolution element to be displayed providing it is greater than the diffraction limit, which is of the order of the ultrasonic wavelength. This is specified in practice by selecting the size of the sensing transducer and the time width of the ultrasonic pulses, as will be pointed out below:

The basic concept of the high resolution ultrasonic imaging scanner is to utilize most of the diffracted wave from each resolution element of the reflecting body to obtain high resolution viewing. This will be performed by a system based on the following principles:

a. A reflecting body in an ultrasonic propagation medium is scanned by ultrasonic pulse reflection detected by ultrasonic sensing transducers, this scanning taking place along a predetermined path or aperture. The image scanner produces a processed image signal time function for high resolution imaging with a specified azimuthal resolved width.

b. The ultrasonic sensing transducer (or transducers) which are used have a width in the azimuthal direction which is less than the specified azimuthal resolved width.

c. This ultrasonic sensing transducer is replicated at a sequence of positions across said predetermined path or aperture. This replication may take place by using a set of such transducers or by traversing a single transducer across the aperture.

d. The aperture length measured in units of the ultrasonic wavelength, must exceed the ratio of the maximum range of said reflecting body (for which the specified resolved width is required) to the specified azimuthal resolved width.

e. Means are provided for successively pulsing an ultrasonic radiation transducer in such a manner that successive pulses shall have a known phase relation to one another. This can be done by making the successive radiated pulses phase coherent with one another. However, it can also be done by using a phase coherent reference oscillator to measure the relative phase between successive pulses, and by imposing this phase relation on a synchronizing signal which references the successive pulses to a common time origin. These two methods are functionally equivalent and may be summarised by the requirement that successive radiated pulses shall have a known determined phase relationship to each other.

f. Means are provided for detection of the sequence of ultrasonic pulse signal time function which are back reflected from the reflecting body and are incident at the replicated sequence of sensing transducer positions, wherein the phase of the reflected pulse functions is preserved by the detection means, i.e., a phase coherent detection system is used.

g. Means are provided for mathematical processing of the sequence of reflected ultrasonic pulse signal time functions by convolution calculation of the detected sequence of reflected pulse time functions with a prescribed filter function. This specially prescribed filter function is mathematically inverse to the filter function characterising a unit amplitude reflecting point return signal from the radiation transducer to the replicated sensing transducer positions in the ultrasonic propagation medium. The means provided for this calculation are the following: An apparatus for generating a fourier transform signal of the prescribed filter function at each range; an apparatus for fourier analysis of the azimuthal variation of said detected sequence of reflected pulse signal functions at each range; means for forming the product function of the said two fourier transforms; and apparatus for inverse fourier analysis of said product function at each range. It is the inverse fourier analysed function which comprises the processed image signal time function for high resolution imaging.

It will be understood that there will be variations of the system which will utilize time continuous ultrasonic radiation wherein this time continuous ultrasonic radiation is phase coherent, or wherein the phase relationship between the ultrasonic radiation at successive points in time is known or can be determined. An imaging scanner using continuous ultrasonic waves to produce a processed image signal time function for high resolution imaging of a reflecting body with a specified azimuthal resolved width can utilize an identical system to that described above, in which the reflecting body is scanned along a predetermined path or aperture by continuous ultrasonic waves with the same conditions specified on the pulsed ultrasonic imaging scanner, using the same combination of means.

The prescribed filter function is a critical element of the above referenced invention. It is specified to be the mathematical inverse to the filter function characterising a unit amplitude reflecting point return signal. In modern detection analysis, the term filter is often used for a time pulse form; the term is also used, more commonly, for the electronic circuit which produces this time pulse form from a sharp (delta function) instantaneous pulse.

To fabricate this filter one must calculate analytically or measure experimentally the reflection signal from a hypothetical unit amplitude reflector at an arbitrary point in the ultrasonic propagation medium, since the prescribed filter is derived from this reflection signal function.

Only the use of the specific filter which bears the fixed relationship of the mathematical inverse to the filter function characterising a back-reflected pulse from a hypothetical unit amplitude reflector at an arbitrary point in the medium, can permit one to process the received signal to reconstruct the reflection signal from each point with high resolution. One can determine the filter function characterising a back-reflected pulse by measuring the time pulse form of the return signal from any reference point of known target characteristics in the medium. One can then calculate the mathematical inverse to this function to obtain the specified filter function to be used for mathematical processing. The use of both analytical and measurement methods to determine the specified filter function are described in the referenced patent. The use of this filter function, the mathematical inverse of the back-reflected pulse signal of the acoustic medium can lead to reconstruction of the reflected signal with high resolution.

It should be pointed out that a sharp distinction should be drawn between the reflection signal from a hypothetical unit amplitude reflector at an arbitrary point in the medium, from which the filter function is derived, and the reflection amplitude from a target point. The reflection amplitude from a target point must be derived by processing the signals received across the entire aperture. Because of diffraction the received signal at any sensing point comes from many reflecting points. Even if there were only one reflecting point in the target, signals from it must be measured at many sensing points across the entire aperture. Thus the reflected amplitude from any target point is not known until it has been extracted from the entire traverse of sensing points by the signal processing operation.

The objective of the above-referenced invention is to obtain a high resolution image from ultrasonic scanning. It will be understood that the azimuthal resolution is obtained by means of the following combination of elements in the acoustic imaging apparatus:
1. The width of the sensing transducer in the azimuthal direction must be less than the resolution width to be obtained.
2. The aperture length over which sensing transducer measurements are made must be related to the resolution width in the following way: The aperture length measured in wavelengths must be greater than the ratio of the maximum range to the resolution width.
3. Convolution processing of the received signal must be performed with a very specific filter function which has been described above. Only such a filter function will give the high resolution signal. Furthermore, the signal processing must be done by convolution methods, e.g., utilising fourier transformations and inverse transforms as described.

It will be understood that the other elements described above are also combined with these elements. The above elements 1 and 2 refer to the azimuthal resolution width. With regard to the resolution in range, on the other hand, it will be understood that the range resolution is determined by the time duration T of the pulse. If the ultrasonic beam makes an angle $\phi$ with the laminar plane being viewed, the range interval $\Delta R$ corresponding to the pulse time duration T is $$\Delta R = \frac{CT}{2} \sec \phi$$

where C is the velocity of ultrasound of the frequency used. Since CT can be chosen to approximate the wavelength, one can have good range resolution, i.e., very small $\Delta R$, as long as the elevation angle $\phi$ is not near normal incidence.

It should be pointed out that the narrow width of the sensing transducer in the azimuthal direction will give it a wide angular beamwidth. It may, however, have a narrower angular beam width consequent to a wider dimension in the direction on its surface perpendicular to the azimuthal direction. In many applications this narrower angular beamwidth will be advantageous. This will be true, for example, when the same transducer is used for sensing and as a radiation transducer.

The wide angular beamwidth (isotropic radiation pattern) of the sensing transducer in the azimuthal direction permits one to amplify the return signal proportionate to the range, without introducing a distortion that is dependent on the incoming direction of the signal. Since there is a significant attenuation in ultrasonic propagation which can be overcome by range dependent amplification, the sensitivity of the system is therefore improved. The signal transit time is proportional to range, and attenuation is also proportional to range. This attenuation can be compensated by time sensitivity amplification, or by sensitivity time control, or by logarithmic amplification; these are forms of range dependent amplification which are described in the radar and ultrasonic literature, and are well known in current technology. The use of wide angular beamwidth transducers eliminates the radiation pattern lobe structure and ensures that range - proportional - amplification will permit reflections at greater ranges to be equally weighed regardless of direction and range. This increases the effective aperture length which receives the diffraction pattern and thus increases the resolution.

It should be pointed out that the wide angular beamwidth of the system described has another significant advantage. If the reflecting body has an angular-dependent ultrasonic reflection pattern, e.g., a tendency to specular ultrasonic reflection has been reported for biological tissue, ultrasonic irradiation from a wide beam-width transducer will produce reflection from any surface orientation, since rays will be incident on the surface from a diffuse array of beam angles. In addition, the phase relations at the various transducer locations can be varied during the course of the scan, giving the effect of scanning each surface from a variety of directions.

The structural embodiment of this high resolution ultrasonic scanner comprises three subsystems:
1. The transducer section and associated structures. This includes radiation transducers, sensing transducers, and position fixing mechanisms.
2. The pulsing and multiplexing subsystem and associated electronic controls. This includes a multiplexer for selection of the transducers and their locations, and of the time of pulsing; an ultrasonic pulse generator; and an ultrasonic reference oscillator for maintaining phase coherence of the pulses.
3. The signal processing and image signal extraction subsystems. This includes the detector, associated amplifiers, and apparatus for mathematical processing of the received sequence of pulse signal time functions.

These structural emements are described in detail in the above-referenced patent.

This completes the description of high resolution imaging scanners as detailed in the above-referenced patent application. The present invention will be directed towards improvement in the third subsystem referred to above, particularly to the mathematical processing subsystem.

It will be understood that the mathematical processing of the sequence of ultrasonic pulse signal time functions can be performed with various types of computing apparatus. In the present invention there will be provided a simple, compact, reliable and low cost combination of electronic apparatus for mathematical processing of said sequence of pulse signal time functions to produce a processed image signal time function for high resolution imaging.

One of the important considerations in mathematical processing of the sequence of ultrasonic pulse signal time functions is adjustment of the processing rate capability of the computation apparatus to the input rate of data values from the pulse functions. It will be understood that as long as the data can be processed at a rate greater than its input rate there will be no processing rate adjustment problem, and one can select from among many methods for mathematical processing. However the present invention will permit the processing rate to be slower than the data input rate. It will be understood that various types of mathematical processing apparatus will operate on their inputs at different time rates, and the order of the computation steps which are feasible may depend on the time processing rate. Thus the data processing rate, the algorithms to be used, and the order of the steps in the computation may depend upon the nature of the apparatus. The present invention is directed towards relatively simple mathematical processing apparatus whose processing rate may be slower than the rate at which the data from the pulse signal time functions are inputted. It is one object of the present invention to provide mathematical processing apparatus for the high resolution ultrasonic imaging scanner which has a slower processing rate than the data input rate, but is nevertheless matched to the scanner operation.

Another object of the present invention is to provide similar mathematical processing apparatus for other types of data input devices. For example, the mathematical characteristics of microwave pulse signal time function, produced by synthetic aperture radar, are qualitatively analogous to those produced by an ultrasonic imaging scanner. The present invention will provide mathematical processing apparatus for synthetic aperture radar which will permit simple, compact and reliable data processing to produce an image for almost - real - time display using electronic means alone. The system will be small and relatively economical. It will utilize commercially available components and apparatus.

It will be understood that one application of the present invention will be to mathematical processing of reflected signals from ultrasonic geophysical imaging systems. In geophysical imaging the source of the ultrasonic pulse is an explosive detonation. Although a variety of sonic frequencies are produced by an explosive detonation, a narrow band-pass filter can be utilized to detect a relatively small frequency band. Furthermore the phase of the narrow band signal pulse can be measured after detonation or during the detection process, as described above. The prescribed filter function for this sonic propagation medium can be determined, hence the entire procedure described above can be applied directly to ultrasonic geophysical imaging. It will therefore be understood that the mathematical processing apparatus of the present invention can be utilised directly for the sequence of reflected signal pulse time functions produced by explosive detonations for ultrasonic geophysical imaging.

These and other objectives of the present invention can be accomplished by means of various electronic apparatus embodiments to be described, which can be diverse in nature but all of which operate according to common principles.

The basic principles by which the various embodiments of this invention are operative may be described with reference to FIG. 1, which shows a schematic diagram of a mathematical processing apparatus for producing a high resolution image signal according to the principles of the present invention. With reference to FIG. 1, the elements of this mathematical processing apparatus are as follows: Input signal data denoted by 1 is inputted into the phase coherent detector denoted by 2. It will be understood that said input signal data will be a sequence of ultrasonic pulse signal time functions back-reflected to the sensing transducer, in the case of an ultrasonic scanner; in other applications, e.g., a radar scanner, said input signal data will be appropriate to the respective applications. Emenating from the detector 2 is the detected signal denoted 3 which is inputted to the electronic memory read-in denoted 4. The electronic memory read-in 4 includes a memory position selector denoted 5 which selects one of a number of read-in locations according to the operation mode of said electronic memory read-in denoted 4. The detected input signals are then stored in the storage means, denoted by 7, in memory fields within said storage means, denoted by 6.

It will be understood that various storage means can be utilised within the present invention. Each said storage means, denoted by 7, will include with it a means for electronic read-in, denoted by 4, and a means for electronic readout, denoted by 10. The electronic read-in means will include a memory position selector denoted by 5, and the electronic readout 10 will include a memory position selector denoted by 9. The memory sybsystem comprising elements 7, 4 and 10 may be an optical storage sube with electronic read-in and read-out. Such an optical storage tube is usually called a scan converter tube and is well known and routinely available in video technology as a means of conversion from one mode of video scan to another mode of scan, wherein the read-in is performed in one scan mode and the readout in another scan mode. It will be understood that such an optical storage scan converter tube utilizes analog type signals.

Another embodiment of the memory subsystem, with elements denoted by 4, 7 and 10 is an analog to digital converter whose output is fed into a digital memory, e.g., a magnetic tape memory unit, a magnetic disc memory unit, a magnetic core memory, or a semiconductor shift register memory array. Each of these embodiments of the memory subsystem includes electronic read-in means, denoted 4, and electronic readout means, denoted 10, as well as the memory medium denoted 7. Each of these embodiments, since it operates on digital data, will require an analog to digital converter as part of element 4. The components and system aspects of these various memory embodiments are well known and these systems are commercially available.

Referring again to the memory fields denoted 6 in which the detected input signals are stored, the mode of storage when an optical storage scan converter tube is used as the storage means may be described as follows. The storage surface may be charactized by an $x$ and $y$ axis denoted by 31. The $x$ axis of the storage surface will denote the azimuthal traverse coordinate, while the $y$ axis will denote the range traverse coordinate. The range scans corresponding to a given $x$ value at which the sensing transducer is positioned are then stored parallel to the $y$ axis. A multiplicity of such range scans are stored in the memory fields denoted by 6 shown in the Figure parallel to the $y$ axis, each such range scan being positioned at its respective $x$ coordinate. When all the range scans have been stored in this way the electronic readout from memory, denoted by 10, can begin to function. The memory position selectors denoted by 9 are used to read out the sets of signal amplitude values arranged in serial order according to sensing transducer positions. These sets of signal amplitudes values denoted by 8 in the Figure, are azimuthal scans at a given range. Hence a multiplicity of such azimuthal scan sets denoted 8 can be read out, one for each resolvable range value.

It will be realized that the optical storage scan converter tube utilizes electron beams for the memory position selectors denoted by 5 in the read-in and by 9 in the readout apparatus. Deflection of these electron beams selects the read-in memory field 6 and the readout memory field 8. Thus the scan converter memory is constructed integrally with its read-in and readout modes to convert range scans denoted by 6 into azimuth scans denoted by 8.

This method of reading-in each reflected pulse signal time function as a range scan, and reading it out as an azimuthal scan, is utklized by each of the storage means which are within the purview of the present invention. The optical storage scan converter performs the read-in parallel to the one dimension axis and the readout parallel to the other dimension axis, of the storage tube. This may be expressed by saying that in the scan converter the indexing is by the $x$ or $y$ axis of the storage tube. In the case of a magnetic core memory, or a magnetic disc memory, or a semiconductor shift memory, or a magnetic tape memory, the indexing of memory locations follows principles appropriate to each memory means.

The common principle is the use of means of storage of the detected sequence of reflected pulse signal time functions in a doubly indexed memory array, indexed by pulse transit time in one indexing dimension and by the sensing transducer position in the other indexing dimension. (It will be understood that the pulse transit time is proportional to range, hence indexing by pulse transit time is equivalent to indexing by range.) In the readback apparatus, the common principle is use of a means for reading back said stored signal time function values in transposed order as a sequence of sets indexed by pulse transit time, in which each set of signal amplitudes is arranged in serial order according to the sensing transducer position.

Referring to FIG. 1, the azimuthal scan readout signal from memory, denoted by 11 proceeds to an analog-to-digital converter, denoted by 12, where the azimuthal scan readout signal is converted from analog to digital form, said digital signal being denoted by 13, for processing by the digital computer denoted by 14, which holds a number of stored programs. The control program within the computer is denoted by 16. A program for fourier analysis of each azimuthal scan for a fixed range value (fixed pulse transit time) by the Fast Fourier Transform algorithm or by another similar algorithm is denoted by 17. A program for generating the fourier transform of the special filter function required for high resolution imaging, as described previously, for the given range value, is denoted by 18. A program which forms the product of the fourier transform values of the azimuthal scan function and the special filter function is denoted by 19. A program for inverse fourier transform of the function produced by the product values produced by the program denoted 19 above, is denoted by 20. This inverse fourier transform program denoted 20 will typically utilize the Fast Fourier Transform algorithm or another similar algorithm.

The digital computer 14, operating from its control program 16, initiates the input of the stored data by a trigger signal, denoted by 15, for readout of the data from electronic readout 10. The azimuthal scan readout signal, denoted by 11 proceeds to an analog-to-digital converter, denoted by 12, where the azimuthal scan readout signal is converted to digital form 13 for processing by the computer 14. It should be pointed out that the analog to digital converter is required when the memory means is a scan converter or any other analog memory device, but is not required at this point if a digital memory means is used.

Entering the computer one now has a sequence of azimuthal scans, each corresponding to a given range value. Each of these azimuthal scans is a set of signal amplitudes corresponding to the same pulse transit time, arranged in serial order according to the sensing transducer position. These sets may therefore be said to be position-dependent sets indexed by pulse transit time. The sequence of these sets, each indexed by pulse transit time, wherein each set of signal amplitudes is arranged in serial order according to the sensing transducer position, is the total signal input into the computer.

The following mathematical operations are now performed by the digital computer 14 in accord with its stored programs 16, 17, 18, 19 and 20 on the signal input. A convolution calculation of this detected sequence of position-dependent sets of reflected signal amplitudes, indexed by the pulse transit time, is now made with the prescribed filter function corresponding to the same transit time. It will be recalled that this filter function is mathematically inverse to the filter function characterising a unit amplitude reflecting point return signal from the radiation transducer to the replicated sensing transducer positions in the ultrasonic propagation medium. With reference to FIG. 1, this convolution calculation proceeds as follows: Digitalized signal 13 is fourier-analyzed by the Fast Fourier Transform program 17 which produces the sequence of fourier transform values for each azimuthal scan. This can be stored in the computer memory while program 18 is utilized to generate the fourier transform of the filter function for the given range value of the azimuthal scan. The computer then uses program 19 to calculate the product function of these two fourier transforms. Finally, the inverse fourier transform program 20 is utilized to calculate the inverse fourier transform of this integral. This inverse fourier transform is the convolution calculation which is sought. The signal function, denoted by 21, which is the output of the digital computer, is the convolution product, i.e., the inverse fourier analysed function which is the processed image signal time function for high resolution imaging.

It will be recognized that the digital computer shown in FIG. 1 with its stored programs is one specific embodiment of apparatus for performing this convolution calculation. More generally, the mathematical processing apparatus may be described as follows: A means is provided for fourier analysis of the position-dependent variation of the detected sequence of sets of signal amplitudes, arranged in serial order according to sensor transducer position, and indexed by pulse transit time, corresponding to each range value. Means are provided for generating a fourier transform signal of the prescribed filter function for each range value. Means are provided for forming the product function of this pair of fourier transforms, and means are provided for inverse fourier analysis of said fourier product function at each range. It is this inverse fourier analyzed function which comprises the processed image signal time function for high resolution imaging.

It will be understood that many options are available for electronic storage and display of the processed image signal for high resolution image. Exemplary means for this storage and display are shown in FIG. 1. The processed image signal in digital form, denoted by 21, is outputted from the computer to a digital to analog converter, denoted by 22. The analog output signal denoted by 23, is inputted to a means for analog storage, denoted by 26, by means of an electronic read-in, denoted by 24. Typically the means for analog storage is an optical storage scan converter tube, denoted by 26, whose electronic read-in apparatus, denoted by 24, is a deflectable electron beam, and whose electronic read-out apparatus, denoted by 27, is also a deflectable electron beam. The technology and applications of optical storage scan converter tubes are well known in video technology, and such devices are commercially available. The processed image signal can be stored in the scan converter and additional signals can be added to it. In particular, additional signal scans can be added for statistical improvement of the signal to noise ratio according to well known principles.

Referring again to FIG. 1, the processed image signal denoted by 29 can be retrieved from the scan converter analogue memory 26 by readout from the electronic readout apparatus, denoted by 27. This image signal can then be displayed on a TV monitor, an oscilloscope, or other electronic display device, denoted by 30.

It will be understood that the above-described system can be embodied in a number of variations, depending on the type of memory storage apparatus which is used, and each of which will have its own specific design features. The optical storage tube scan converter, described above, is a well known analogue memory apparatus which is commercially available. It is usually available with electronic circuitry for read-in and read-out of information upon initiation by appropriate trigger signals. It will be understood that the scan converter can store only positive signals; however, the amplitude signals to be stored will be both positive and negative. In order to store amplitude values of both signs one can add a known bias voltage or current to the signal amplitude which is to be stored, thus making the stored quantity positive. Upon readout, the bias voltage is subtracted from the signal amplitude, thus restoring the algebraic sign of the signal amplitude.

It will be understood that it will usually be convenient to operate the memory storage apparatus by reading in range scans, corresponding to a given azimuth position, and reading out azimuthal scans, corresponding to a given range value. It will be understood that the individual range scans can be read in over an extended time period if desired, and that the readout of the azimuthal scans will not begin till the completion of the range scan read-ins. Thus one of the advantages of the present apparatus is to decouple the time scales for read-in and read out. The range scan read-ins can take place at any convenient pace, while the azimuthal scan readouts will begin after the completion of the range scans. Each azimuthal scan readout can be followed by the entire mathematical processing operation for its data set. Thus the azimuthal scan readout and mathematical processing will take place on a line-by-line processing basis.

It will be understood that when any analogue memory apparatus is used, e.g., the optical storage tube scan converter, an analogue-to-digital converter must be applied to its output before this output can be processed by the digital computer which performs the convolution processing. If, however, the memory storage apparatus is digital, e.g., a magnetic core memory, disc memory, magnetic tape memory, or semiconductor circulatory shift register memory, the analogue-to-digital conversion must be performed before storage of said signal range scan in said memory.

It will be understood that the present invention utilizes a digital computer to perform the convolution calculation of each azimuthal scan (for a fixed range value) with the appropriate inverse filter function for said fixed range value. Said digital computer program will utilize a number of internally stored programs to perform this convolution calculation on an azimuthal line-by-line basis. These programs will include a program for producing the fourier transform of each azimuthal scan, a program for generating the fourier transform of the appropriate inverse filter function for each range value, and a program for producing the product function of these two fourier transforms. There is also required a program for inverting this product of fourier transforms to produce the convolution function. The digital computer will also require a control program to coordinate and control the programs described above, and to control and trigger the input and output of data from the sensors, from the memory storage apparatus, including the analogue-to-digital converter, and to the data display apparatus.

It will be understood that the high resolution processed image signal, may be displayed immediately, in a variety of devices, or it may first be stored electronically or other wise. The use of an optical storage tube scan converter to store the processed image signal is an economical and convenient means for such storage, which requires a digital-to-analogue converter for its input. Alternatively, one may use magnetic storage means, e.g., disc storage, magnetic tape, etc., as described above. When the processed image signal is electronically stored one can recall it for viewing in a video display device or in a photographic or hard copy printer, all of which technologies are well known.

It will be understood that the type of sensor from which the scanning pulse signal time function is obtained may take a variety of forms depending on the system being observed. One may use an ultrasonic transducer, as described herein, for producing ultrasonic pulse signal time functions in order to observe an ultrasonic propagation medium. For geophysical exploration one may use explosive detonations to produce pulses for seismic exploration. The detection sensor may be a pressure sensitive transducer with an appropriate narrow bandpass filter, and a coherent oscillator for measuring the phase of the back-reflected signal with reference to the phase of the emitted pulse. For microwave imaging of microwave reflecting media, the sensor may be a microwave source and receiver.

It will also be understood that various means may be utilised for preserving the relative phase of the individual pulse signal time functions. A coherent ultrastable oscillator can be utilised to preserve this relative phase in a number of ways. The oscillator may trigger the emission of successive pulses, thus setting their "time zeros" at the correct phase relationship with one another. Alternatively, the pulse emission time need not be set, but the pulse arrival time can be measured with great precision instead, using the ultrastable oscillator. The phase of the pulse arrival time is thus measured, and a phase shift can then be applied to the entire pulse signal time function, to bring successive pulses into uniform phase relationship with one another. The measurement of the phase of each back-reflected pulse time function, using an ultrastable oscillator, provides an alternative method for making the successive pulses phase coherent. Instead of emitting successive pulses with a fixed phase relationship, one measures the phases of each arrived pulse against a single ultrastable oscillator, against which the pulse emission time was also measured. The phase difference for each pulse is then measured as the difference of these two values, and the resulting phase factor is applied to the pulse to set all pulses to a common zero phase setting. This can be done by an additional program within the computer for readdressing the range scan values in the memory storage system in accordance with the measured phase differences of successive scans.

It has been pointed out above that such imaging scanners can be used for ultrasonic, microwave, geophysical and other propagation mediums. These various applications can be generalized by terming them imaging scanners for high resolution imaging from reflecting targets in a signal propagating medium. The mathematical processing apparatus is designed to perform convolution processing of a sequence of reflected pulse signal time functions utilising a specified inverse filter function characterising signal propagation in said medium. A number of embodiments of this mathematical apparatus have been described above. Typical of these embodiments is the combination comprising at least one optical storage tube scan converter, at least one analog to digital converter, and at least one digital computer programmed to read back digitalized azimuthal scan functions from said scan converter and to perform convolution calculations of said azimuthal scan functions with said filter function.

While the description of mathematical processing apparatus for imaging scanners and structural embodiments relating to it have been set forth above, it will be appreciated that other obvious variations can be made in carrying out the invention disclosed herein. Accordingly, such variations falling within the purview of this invention may be made without in any way departing from the spirit of the invention or sacrificing any of the attendant advantages thereof, providing however that such changes fall within the scope of the claims appended hereto.

What is claimed is:

1. An ultrasonic imaging scanner wherein a reflecting body in an ultrasonic propagation medium is scanned along a predetermined path or aperture by ultrasonic pulses to produce a processed image signal time function for high resolution imaging of said reflecting body with specified azimuthal resolved width, comprising in combination a. at least one ultrasonic sensing transducer whose width in the azimuthal direction is less than the specified azimuthal resolved width
   b. means for replication of said ultrasonic sensing transducer at a sequence of positions across said aperture, wherein the aperture length measured in units of the ultrasonic wavelength, must exceed the ratio of the maximum range of said reflecting body, to the specified azimuthal resolved width
   c. at least one ultrasonic radiation transducer
   d. means for successively pulsing said ultrasonic transducer wherein successive pulses have a determined phase relation to one another
   e. means for detection of a sequence of ultrasonic pulse signal time functions, back reflected from said reflecting body and incident at said replicated sequence of sensing transducer positions, wherein the phase of said reflected pulse functions is preserved by said detection means
   f. means for storage of said detected sequence of reflected ultrasonic pulse signal time functions in a doubly indexed memory array indexed by pulse transit time in one indexing dimension and by the sensing transducer position in the other indexing dimension
   g. means for reading back said stored signal time function values in transposed order as a sequence of sets indexed by pulse transit time, wherein each set of signal amplitudes is arranged in serial order according to the sensing transducer azimuthal position coordinate
   h. means for mathematical processing of said sequence of sets indexed by pulse transit time, by convolution calculation of said sequence of azimuthal position-dependent sets of reflected signal amplitudes with a prescribed filter function which is mathematically inverse to the filter function characterising a unit amplitude reflecting point return signal from said radiation transducer to said replicated sensing transducer positions in said ultrasonic propagation medium; said means including means for producing the fourier transform of the azimuthal position-dependent variation of each said set at each range corresponding to each pulse transit time, means for generating a fourier transform signal of said prescribed filter function at each range, means for forming the product function of said fourier transforms, and means for inverse fourier analysis of said product function at each range, said inverse fourier analysed function comprising said processed image signal time function for high resolution imaging.

2. An ultrasonic imaging scanner as defined in claim 1 wherein the means for storage of said detected sequence is an optical storage tube scan converter.

3. An ultrasonic imaging scanner as defined in claim 1, wherein the means for mathematical processing of said sequence of sets indexed by pulse transit time is a digital computer programmed to perform convolution of each said position dependent signal amplitude set, with said inverse filter function characterising said ultrasonic propagation medium, and corresponding to said pulse transit time.

4. An ultrasonic imaging scanner as defined in claim 1 wherein the means for storage and readback of said detected sequence is a magnetic memory medium with electronic readback circuits.

5. In an imaging scanner for high resolution imaging from reflecting targets in a signal propagating medium, apparatus for convolution processing of a sequence of reflected pulse signal time functions utilising a specified inverse filter function characterising signal propagation in said medium, the combination including a. at least one optical storage tube scan converter
   b. at least one analog to digital converter
   c. at least one digital computer programmed to read back digitalized azimuthal scan functions from said scan converter and to perform convolution calculations of said azimuthal scan functions with said filter function.

6. An imaging scanner as defined in claim 5 wherein said signal is ultrasonic and said filter function characterises ultrasonic propagation in an ultrasonic propagating medium.

7. An imaging scanner as defined in claim 5 wherein said signal is microwave and said filter function characterises microwave propagation in a microwave propagating medium.

8. An imaging scanner as defined in claim 5 wherein said signal results from explosive detonation and said filter function characterises explosive detonation waves in a geophysical medium.

9. Apparatus for mathematical processing of a sequence of reflected pulse signal time functions received by a sensing transducer which occupies a sequence of positions along a predetermined path or scanning aperture, wherein each reflected pulse signal time function corresponds to a position of the sensing transducer along said scanning aperture, and wherein the time variable in each said time function indexes the reflected pulse signal amplitude within said function, the combination including
   a. means for detection of said reflected pulse signal time functions, wherein the relative phase of said reflected pulse signal time functions is preserved by said detection means
   b. means for storing each said reflected pulse signal time function as a set of signal amplitude values at successive time points, said signal time functions being sequentially indexed according to the position of the sensing transducer along said scanning aperture
   c. means for readout of said stored signal amplitude values as a spatially dependent sequence indexed by the time variable within each pulse signal, wherein each said sequence of amplitudes is read out in serial order according to the position of the sensing transducer for said amplitude value, and all amplitude values within each sequence correspond to a given value of the time variable within each pulse, said serial order comprising an aperture position dependent spatial function corresponding to a given value of the time variable within each pulse
   d. means for mathematical processing of said spatially dependent sequences of time indexed reflected signal amplitudes, by convolution calculation of said time indexed sequence with a prescribed filter function; said means including means for fourier analysis of the spatial variation of each said time indexed sequence, means for generating a fourier transform signal for the prescribed filter function, means for forming the product function of said fourier transforms, and means for inverse fourier analysis of said product function at each time index, said set of inverse fourier analysed functions at each time index comprising a processed image signal.

10. Mathematical processing apparatus as defined in claim 9, wherein the processed image signal is converted to analog form and stored in an optical storage tube scan converter before display of the image.

11. Mathematical processing apparatus as defined in claim 9, wherein said processing operations are performed by a digital computer with internally stored program for performing storage, readout in said spatial dependent sequence, and said convolution calculations.

12. Mathematical processing apparatus as defined in claim 9 wherein said convolution calculations are performed by a digital computer using the fast fourier transform algorithm.

13. Mathematical processing apparatus as defined in claim 9 wherein an analog to digital converter is utilized to process the input to said digital computer.

14. Apparatus for mathematical processing as defined in claim 9, wherein said detection means includes means for measuring the phase of each said pulse relative to a phase stable reference oscillator signal to obtain a measured phase reference value within each said pulse, and wherein said means for mathematical processing of said spatially dependent sequences of time indexed reflected signal amplitudes includes means for readout and re-storage of said sequences, into new storage locations, in which the signal amplitude translation in said memory is proportional to the measured phase value differences of successive spatially dependent pulse sequences, thus setting all pulses to a common zero phase setting.

15. Mathematical processing apparatus as defined in claim 9 wherein the storage and readout take place in an optical storage tube scan converter.

16. Mathematical processing apparatus as defined in claim 9 wherein said reflected pulse signal time function is digitalized before storage and processing.

17. Mathematical processing apparatus as defined in claim 9 wherein the storage and readout take place in a magnetic storage medium.

18. Apparatus for mathematical processing as defined in claim 11, wherein said detection means includes means for measuring the phase of each said pulse relative to a phase stable reference oscillator signal, to obtain a measured phase reference value within each said pulse, and wherein said computer includes a program for re-addressing each said spatially dependent sequence of time indexed pulse signal amplitude values in the memory storage system in accordance with the measured phase reference value differences in successive sequences, thus setting all said pulse sequences to a common zero phase setting.

* * * * *